United States Patent Office 2,961,458
Patented Nov. 22, 1960

2,961,458
PHOSPHORUS CONTAINING INSECTICIDAL COMPOUNDS AND A PROCESS FOR THEIR PRODUCTION

Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Filed Oct. 13, 1959, Ser. No. 846,067
Claims priority, application Germany Oct. 17, 1958
19 Claims. (Cl. 260—461)

The present invention relates to and has as its objects new and useful insecticidal phosphorus containing compounds as well as processes for producing same. Generally the new compounds of the present invention may be represented by the following formula

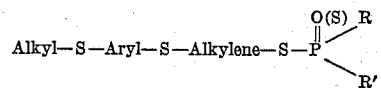

wherein R and R′ broadly stand for radicals completing the other side of the molecule to a phosphoric, phosphonic or phosphinic acid derivative or their thioanalogous compounds.

The [(alkylmercapto-aryl)-mercapto-alkyl]-phosphoric- or -thionophosphoric, phosphonic- or -thionophosphonic, phosphinic- or -thionophosphinic acid derivatives have previously not been known from literature. This new class of compounds has been found to have an excellent insecticidal activity, in some cases also against eating insects.

The new compounds may be produced in manners known in principle, e.g. by conversion of (alkylmercapto-aryl)-mercapto-alkyl halides with salts of O.O-dialkyl-thio- or -dithiophosphoric, -phosphonic or phosphinic acids, as it is to be seen from the following formula

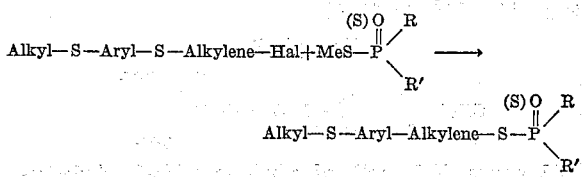

In these formulae the symbols have the same significance as shown above, Hal preferably stands for chlorine or bromine and Me stands for a salt-forming radical, especially an alkali metal or an ammonium group.

The aforementioned reaction is preferably carried out at room temperature or slightly elevated temperature, expediently working in the presence of inert solvents or diluents.

More specifically the compounds of the present invention are S-(lower alkyl-mercapto-phenyl-mercapto-methyl)-phosphoric, -phosphonic or -phosphinic acid derivatives of the following formula

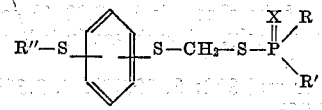

wherein R and R′ stand for lower alkyl or lower alkoxy groups, R″ stands for a lower alkyl group, and X is either oxygen or sulfur. A still more preferred class of compounds are the compounds in which the two sulfur atoms at the phenyl nucleus are attached in para-position.

The new compounds of the present invention very effectively kill insects like flies, mites, aphids etc. They distinguish themselves especially by a good contact-insecticidal activity and at the same time by an activity on eating insects such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the esters of the following formulae have been tested against spider mites and aphids:

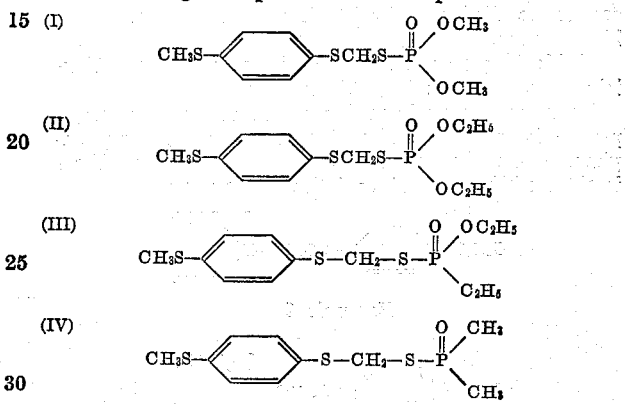

Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out as follows:

(a) Against spider mites (contact-insecticidal action): Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. The following results have been obtained:

| Compound | aqueous concentration (in percent active ingredient/water) | killing rate (in percent) |
|---|---|---|
| (I) | 0.01 | 100 |
| (II) | 0.001 | 100 |
| (III) | 0.001 | 100 |
| (IV) | 0.01 | 100 |

(b) Against aphids (contact-insecticidal action) of the type *Doralis fabae*: Heavily infested bean plants (*Vicia faba*) have been sprayed drip wet with solutions as prepared above. The effect has been determined by evaluation after 24 hours by counting the dead pests either on the surface of the soil or still remaining on the plants. The following results have been obtained:

| Compound | aqueous concentration (in percent active ingredient/water) | killing rate (in percent) |
|---|---|---|
| (I) | | |
| (II) | 0.01 | 100 |
| (III) | 0.001 | 70 |
| (IV) | 0.01 | 100 |

The production of the new compounds is to be seen from the following examples:

Example 1

(I) $CH_3S-\langle\rangle-SCH_2S-P\underset{OCH_3}{\overset{O\ \ OCH_3}{\|\diagup}}$ Into a solution of 45 grams of dimethylthionothiolphosphoric acid ammonium salt in 150 cc. of acetone there are added dropwise at 42° C. 42 grams (0.2 mol) of α-chloromethyl-p-methylmercaptophenyl sulfide and the mixture is then heated on a boiling water bath for 1 hour. Methylene chloride is stirred into the cold reaction mixture and the salt is filtered off. The filtrate is washed several times with water and the solvent is removed in vacuo from the dried methylene chloride layer. The ester precipitates in the form of a pale yellow oil which cannot be distilled without decomposition, even in a high vacuum.

Yield: 51 grams, i.e. 78.5% of the theoretical. Toxicity on rats per os: $LD_{50}$ 100 mg./kg.

By the same way, but using instead of α-chloromethyl-p-methylmercaptophenyl sulfide the corresponding p-ethylmercapto-compound in its exact molecular amount there is obtained the ester of the following formula $C_2H_5S-\langle\rangle-SCH_2S-P\underset{OCH_3}{\overset{S\ \ OCH_3}{\|\diagup}}$

Example 2

$CH_3S-\langle\rangle-SCH_2S-P\underset{OCH_3}{\overset{O\ \ OCH_3}{\|\diagup}}$ 40 grams of dimethyl-thiolphosphoric acid ammonium salt are reacted and worked up in the same manner as described in Example 1 with 42 grams of α-chloromethyl-p-methylmercaptophenyl sulfide. 34 grams of the new ester are obtained in the form of a pale yellow oil which cannot be distilled without decomposition, even in a high vacuum.

Toxicity on rats per os: $LD_{50}$ 50 mg./kg. Spider mites are killed completely with 0.01% solutions.

Example 3

$CH_3S-\langle\rangle-SCH_2S-P\underset{OC_2H_5}{\overset{S\ \ OC_2H_5}{\|\diagup}}$ 40 grams of diethyl-thiono-thiolphosphoric acid ammonium salt are dissolved in 150 cc. of acetone and 30.5 grams of chloromethyl-p-methylmercaptophenyl sulfide are added dropwise at 35° C. The temperature rises to 470 C. whilst ammonium chloride is separated out. The mixture is heated on a boiling water bath for half an hour and eventually worked up as described in Example 1. The new ester obtained dissolves clearly in cyclohexane and was chromatographically purified on aluminium oxide.

Yield: 53 grams, i.e. 99% of the theoretical. 0.001% solutions kill spider mites to 100%, 0.01% solutions kill aphids to 100%.

Example 4

$CH_3S-\langle\rangle-SCH_2S-P\underset{OC_2H_5}{\overset{O\ \ OC_2H_5}{\|\diagup}}$ 45 grams of diethyl-thiolphosphoric acid ammonium salt in 150 cc. of acetone are reacted and worked up in the same manner as described in Example 3, with 43 grams of chloromethyl-p-methylmercaptophenyl sulfide.

Yield: 65 grams, i.e. 97.5% of the theoretical. The ester is obtained in the form of a pale yellow oil which cannot be distilled without decomposition even in a high vacuum.

By the same way, but using instead of chloromethyl-p-methylmercaptophenyl sulfide the exact equimolecular amount of the corresponding p-isopropyl-mercapto-compound there is obtained the following ester $i-C_3H_7S-\langle\rangle-SCH_2S-P\underset{OC_2H_5}{\overset{O\ \ OC_2H_5}{\|\diagup}}$

Example 5

$CH_3S-\langle\rangle-SCH_2S-P\underset{OC_3H_7i}{\overset{O\ \ OC_3H_7i}{\|\diagup}}$ According to the method described in Example 1 50 grams of diisopropyl-thiolphosphoric acid ammonium salt in acetone are reacted with 43 grams of chloromethyl-p-methylmercaptophenyl sulfide and worked up in the same manner.

Yield: 71 grams, i.e. 97% of the theoretical. The ester is obtained in the form of a pale yellow oil which canont be distilled without decomposition, even in high vacuum. Toxicity on rats per os: $LD_{50}$ 100 mg./kg. Aphids are destroyed to 100% with 0.01% solutions.

Example 6

$CH_3S-\langle\rangle-SCH_2S-P\underset{OC_3H_7i}{\overset{O\ \ OC_3H_7i}{\|\diagup}}$ If 26 grams of diisophopyl-thiono-thiolphosphoric acid ammonium salt are reacted at 50–60° C. with 24 grams of chloromethyl-p-methylmercaptophenyl sulfide in acetone analogously to the instruction given in Example 1, there are obtained after the same working up 39 grams of the new ester (i.e. 91% of the theoretical) in the form of a pale yellow oil which cannot be distilled without decompositon, even in a high vacuum.

Toxicity on rats per os: $LD_{50}$ 100 mg./kg. 0.1% solutions kill aphids to 100%.

Example 7

$CH_3S-\langle\rangle-S-CH_2-S-P\underset{C_2H_5}{\overset{O\ \ OC_2H_5}{\|\diagup}}$ 42 grams (0.2 mol) of ethyl-monothio-O-ethylesterphosphonic acid potassium salt are dissolved in 100 cc. of acetonitrile. 42 grams (0.2 mol) of α-chloromethyl-(p-methylmercaptophenyl)-thioether (b.p. 130° C./2 mm Hg), dissolved in 50 cc. of acetonitrile, are added thereto with stirring at 40° C. The mixture is warmed to 60° C. for an hour and then cooled to room temperature. The reaction product is poured into 200 cc. of ice water. The separated oil is taken up in 300 cc. of benzene. The benzene solution is washed neutral with water and subsequently dried with sodium sulfate. Upon distilling off benzene there remain 63 grams of the new ester as a colorless sparingly water-soluble oil.

Yield: 97% of the theoretical. 0.001% solutions kill spider mites completely. Aphids are killed to 70% with 0.001% solutions.

Calculated for mol 322: S, 29.8%; P, 9.6%. Found: S, 29.2%; P, 9.8%.

Example 8

$CH_3S-\langle\rangle-S-CH_2-S-P\underset{CH_3}{\overset{S\ \ OCH_3}{\|\diagup}}$ $CH_3S-\langle\rangle-S-CH_2-S-P\underset{CH_3}{\overset{S\ \ OCH_3}{\|\diagup}}$ 21 grams (0.1 mol) of methyl-O-methyl esterdithiophosphonic acid potassium salt are dissolved in 75 cc. of acetonitrile. A solution of 21 grams (0.1 mol) of α-chloromethyl-(p-methylmercaptophenyl)-thioether in 50 cc. of acetonitrile are added thereto at 40° C. The mixture is warmed to 60° C. for an hour and then worked up as described in Example 1. 28 grams of the new ester are obtained as a yellow water-insoluble oil.

Yield: 90% of the theoretical. Spider mites are killed completely with 0.001% solutions, aphids are killed completely with 0.01% solutions.

Calculated for mol 310: S, 41.3%; P, 10.0%. Found: S, 40.9%; P, 9.6%.

By the same way, but using instead of α-chloromethyl-(p-methylmercaptophenyl)-thioether the corresponding equimolecular amount of the p-ethylmercapto-compound there is obtained the following ester

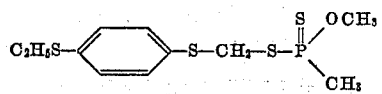

*Example 9*

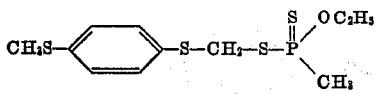

23 grams (0.1 mol) of methyl-O-ethyl ester-dithiophosphonic acid potassium salt are dissolved in 50 cc. of acetonitrile. 21 grams (0.1 mol) of α-chloromethyl-(p-methylmercaptophenyl)-thioether, dissolved in 50 cc. of acetonitrile, are added thereto at 40° C. while stirring. The mixture is warmed to 65° C. for a further hour and then worked up in a usual manner. 30 grams of the new ester are obtained as a yellow water-insoluble oil. Yield: 92% of the theoretical. Spider mites are killed to 80% with 0.0001% solutions. Aphids are killed completely with 0.01% solutions.

Calculated for mol 324: S, 39.4%; P, 9.5%. Found: S, 38.8%; P, 9.1%.

*Example 10*

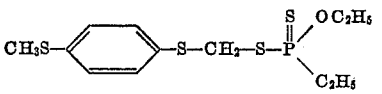

23 grams (0.1 mol) of ethyl-O-ethyl ester-dithiophosphonic acid potassium salt are dissolved in 50 cc. of acetone. 21 grams (0.1 mol) of α-chloromethyl-(p-methylmercaptophenyl)-thioether, dissolved in 50 cc. of acetone, are added thereto at 40° C. while stirring. The mixture is warmed to 65° C. for an hour and then worked up in a usual manner. 31 grams of the new ester are obtained as a yellow water-insoluble oil.

Yield: 91% of the theoretical. Spider mites are killed to 80% with 0.0001% solutions. Aphids are killed to 60% with 0.001% solutions.

Calculated for mol 338: S, 37.8%; P, 9.1%. Found: S, 37.9%; P, 8.9%.

*Example 11*

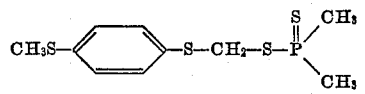

20 grams (0.1 mol) of dimethyl thiono-thiolphosphinic acid potassium salt are dissolved in 50 cc. of acetonitrile. 21 grams (0.1 mol) of α-chloromethyl-(p-methylmercaptophenyl)-thioether, dissolved in 50 cc. of acetonitrile, are added thereto at 30–40° C. with stirring. The mixture is warmed to 70° C. for one hour and then worked up in a usual manner. In this way, 27 grams of the new ester are obtained as a pale yellow water-insoluble oil.

Yield: 91% of the theoretical. Spider mites and aphids are killed completely with 0.01% solutions.

Calculated for mol 294: S, 43.5%; P, 10.5%. Found: S, 43.3%; P, 10.3%.

*Example 12*

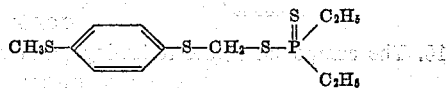

46 grams (0.2 mol) of diethyl-dithiophosphinic acid potassium salt are dissolved in 100 cc. of acetonitrile. 42 grams (0.2 mol) of α-chloromethyl-(p-methylmercaptophenyl)-thioether, dissolved in 50 cc. of acetonitrile, are added thereto at 30° C. while stirring. The mixture is warmed to 70° C. for an hour and worked up in a usual manner. In this way, 62 grams of the new ester are obtained as a yellow water-insoluble oil.

Yield: 95% of the theoretical. Spider mites are killed completely with 0.001% solutions. Aphids are killed completely with 0.01% solutions.

Calculated for mol 323: S, 39.6%; P, 9.6%. Found: S, 38.9%; P, 9.5%.

We claim:

1. A phosphorus containing compound of the following general formula

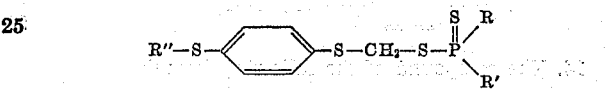

wherein R and R′ stand for a member selected from the group consisting of lower alkyl and lower alkoxy groups, R″ stands for lower alkyl groups, and X stands for a member selected from the group consisting of oxygen and sulfur.

2. A thiophosphoric acid ester of the following formula

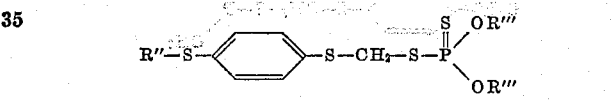

wherein R″ and R‴ stand for lower alkyl radicals.

3. A thiophosphonic acid ester of the following formula

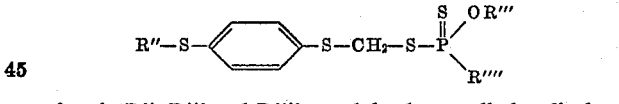

wherein R″, R‴ and R″″ stand for lower alkyl radicals.

4. A thiophosphinic acid ester of the following formula

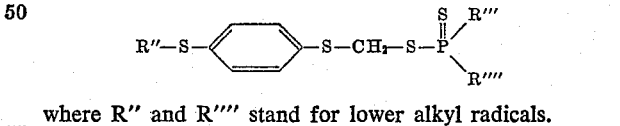

where R″ and R″″ stand for lower alkyl radicals.

5. The compound of the following formula

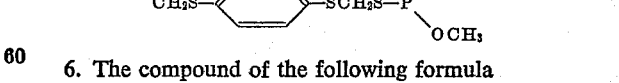

6. The compound of the following formula

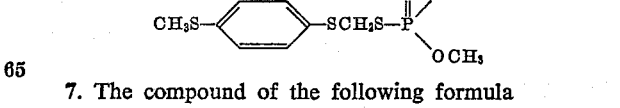

7. The compound of the following formula

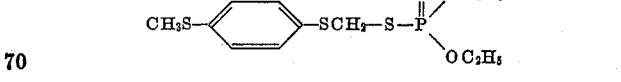

8. The compound of the following formula

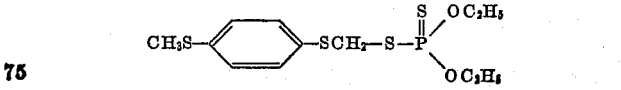

9. The compound of the following formula

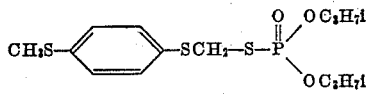

10. The compound of the following formula

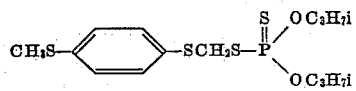

11. The compound of the following formula

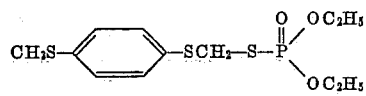

12. The compound of the following formula

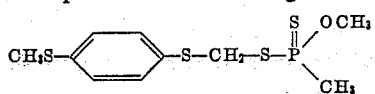

13. The compound of the following formula

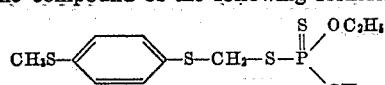

14. The compound of the following formula

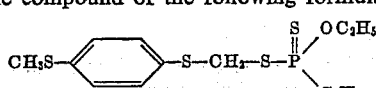

15. The compound of the following formula

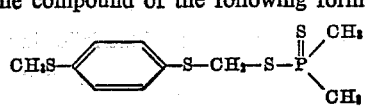

16. The compound of the following formula

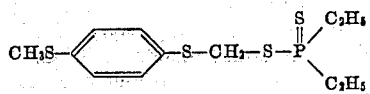

17. A thiophosphoric acid ester of the following formula

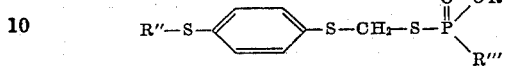

where R'' and R''' stand for lower alkyl radicals.

18. A thiophosphonic acid ester of the following formula

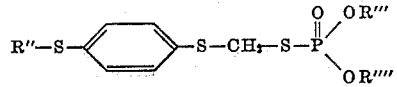

where R'', R''' and R'''' stand for lower alkyl radicals.

19. A thiophosphinic acid ester of the following formula

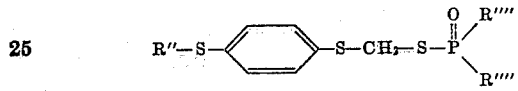

where R'' and R'''' stand for lower alkyl radicals.

References Cited in the file of this patent

FOREIGN PATENTS 772,213    Great Britain ---------- Apr. 10, 1957

UNITED STATES PATENT OFFICE
Certificate of Correction

Patent No. 2,961,458      November 22, 1960

Ernst Schegk et al.

It is hereby certified that error appears in the above numbered patent requiring correction and that the said Letters Patent should read as corrected below.

Column 1, lines 41 to 44, the formula should appear as shown below instead of as in the patent:

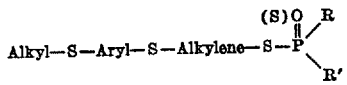

column 3, lines 5 to 8, the formula should appear as shown below instead of as in the patent:

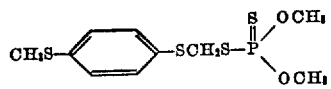

same column 3, line 56, for "470 C." read —47° C.—; column 4, lines 27 to 31, the formula should appear as shown below instead of as in the patent:

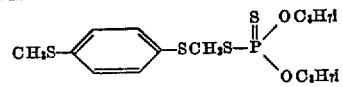

same column 4, line 32, for "diisophopyl-" read — diisopropyl- —; lines 72 to 74, strike out the structural formula; column 6, lines 24 to 28, the formula should appear as shown below instead of as in the patent:

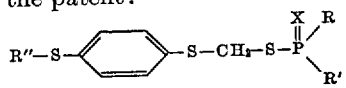

same column 6, lines 50 to 53, the formula should appear as shown below instead of as in the patent:

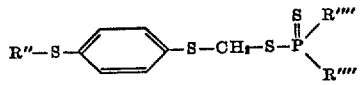

same column 6, lines 56 to 59, the formula should appear as shown below instead of as in the patent:

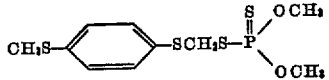

same column 6, lines 61 to 65, the formula should appear as shown below instead of as in the patent:

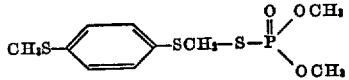

same column 6, lines 72 to 75, the formula should appear as shown below instead of as in the patent:

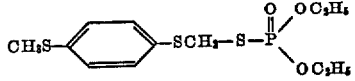

column 7, lines 12 to 15, the formula should appear as shown below instead of as in the patent:

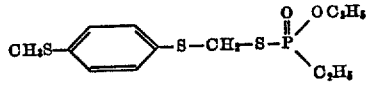

Signed and sealed this 27th day of June 1961.

[SEAL]

Attest:
ERNEST W. SWIDER,
*Attesting Officer.*

DAVID L. LADD,
*Commissioner of Patents.*